United States Patent [19]

Tokuda

[11]  4,344,708

[45]  Aug. 17, 1982

[54] METHOD AND APPARATUS FOR EXPOSURE QUANTITY CONTROL IN AUTOMATIC COLOR PRINTER

[75] Inventor: Kanji Tokuda, Minami-ashigara, Japan

[73] Assignee: Fuji Photo Film Co., Ltd., Kanagawa, Japan

[21] Appl. No.: 274,570

[22] Filed: Jun. 17, 1981

Related U.S. Application Data

[63] Continuation of Ser. No. 807,994, Jun. 20, 1977, abandoned.

[30] Foreign Application Priority Data

Jun. 21, 1976 [JP]  Japan ................................. 51/73684

[51] Int. Cl.$^3$ ............................................. G03B 27/72
[52] U.S. Cl. ..................................... 356/404; 355/35

[58] Field of Search ............................. 356/404, 223; 355/35–38

[56] References Cited

U.S. PATENT DOCUMENTS 3,482,916  12/1969  Mey et al. ..................... 356/175 X

Primary Examiner—John K. Corbin
Assistant Examiner—Bruce Y. Arnold
Attorney, Agent, or Firm—Sughrue, Mion, Zinn, Macpeak & Seas

[57]  ABSTRACT

A slope control type of exposure quantity control system is modified to include a portion for simultaneously controlling the extent of both color correction and density correction, and a portion for independently controlling only the extent of density correction, thereby allowing an automatic color printer to be set to desired values with respect to both color correction and density correction.

2 Claims, 2 Drawing Figures

METHOD AND APPARATUS FOR EXPOSURE QUANTITY CONTROL IN AUTOMATIC COLOR PRINTER

This is a continuation of application Ser. No. 807,994, filed June 20, 1977, now abandoned.

BACKGROUND OF THE INVENTION

This invention relates to a method of controlling the exposure quantity in an automatic color picture printer in which density correction may be implemented without affecting the extent of the tri-color exposure quantity correction.

Conventional automatic color picture printers employ an integration neutralization system based on the fact that in ordinary photographic scenes the mean reflectivity of the three primary colors obtained by integrating the entire scene is substantially constant. Accordingly, a picture print having uniform density and color balance is obtained by bringing the integration value of the light transmission quantities of the three primary colors (blue, green and red) from the entire film negative close to a certain value. With such a control system, however, it is impossible to provide sufficiently satisfactory prints from a film negative having an extremely wide range of density and color balance. The main reasons for this are as follows:

(1) Irregularity of photographic papers (chemical factor)
(2) Delay in shutter operation (Mechanical factor)
(3) Irregularity of electrical circuits (Electrical factor)
(4) Imperfections in light receiving filters (Optical factor)

In order to eliminate the undesirable effects of these factors, a so-called slope circuit has been proposed, and is now employed in most conventional color printers. In such printers a reference or standard film negative is provided, and in printing another film negative the exposure quantity determined by the above-described method is corrected in accordance with the difference in density between the film negative being prepared and the reference film negative. More specifically, if it is assumed that the densities of the three colors of the reference film negative are represented by Dn, the exposure times of the three colors are represented by Tn, and the densities of the three colors of an optional film negative are represented respectively by Dy (yellow), Dm (magenta) and Dc (cyan), then the exposure times of the three colors for the new film negative can be determined by the following equations:

$$\log T_B = Cy(Dy - Dn) + \log Tn \qquad (1)$$
$$\log T_G = Cm(Dm - Dn) + \log Tn,$$
$$\log T_R = Cc(Dc - Dn) + \log Tn$$

where Cy, Cm and Cc are constants representing the magnitudes of the slopes. If all of the constants are unity or one, there is no slope. If the density increases by one, the exposure time increases by a factor of ten.

In an exposure system where the densities of the three colors of a film negative are obtained and used to control the exposure times of the three colors, the following equations are employed instead of equations (1) above:

$$Dy' = Cy(Dy - Dn) + Dn \qquad (2)$$
$$Dm' = Cm(Dm - Dn) + Dn$$
$$Dc' = Cc(Dc - Dn) + Dn$$

According to these equations the original densities of the three colors in a film negative are converted into density values Dy', Dm' and Dc', and exposure control is then effected by utilizing these resultant density values as if they were the original densities of the film negative. Equations (2) above therefore determine the slope quantities.

When a film negative is color-balanced by the conversions defined by equations (2), no matter what density the film negative has, the integration of the densities of the three colors over the entire picture provides prints whose three colors are constant at all times. For instance, if the values Cy, Cm and Cc are satisfactorily controlled, prints which are well-balanced in color and density can be provided even if the densities (Dy, Dm, and Dc) of the three colors are, for example, (0.1, 0.1, 0.1) or (1.5, 1.5, 1.5). When prints are to be made from film negatives which are out of color balance, however, if no correction is applied the prints may appear correct in density but out of color balance. When the color of a print negative is magenta, for example, and the three color densities are (0, 1, 0), the exposure quantity is such that green light is increased but red and blue light are decreased. Color correction is therefore effected to some extent, and the resulting print appears rather gray. This correction is not sufficient, however, and therefore the print obtained is gray with dark green. The reason for this is as follows. As the color of the film negative is entirely magenta, the light incident on the green light sensor is rather dark. However, because of the imperfection of the green filter, light other than green light is applied thereto and the damping component of the actual green light is thus underdetected. On the other hand, the red and blue light sensor filters are also imperfect, and some green light is therefore detected by them. As a result, because of the added damping of the green light, the detection outputs erroneously indicate that the red light and blue light are correctly damped. Accordingly, in the respective light sensors color deviations are underdetected and color correction is under controlled. Thus, the resulting print is tinted with green rather than gray.

In addition, the light applied to photographic paper is not completely independent of coloring. That is, the light for producing one color may sometimes serve to reduce the other colors. Therefore, even if the Cy, Cm and Cc values are suitably adjusted to obtain prints from the film negative which are properly color balanced (that is, even if the density correction is perfect), in prints made from a film negative which is out of color balance the color correction will be imperfect. That is, the density correction is perfectly carried out, but at the expense of the color correction. This is a condition where the density correction is completely achieved, but the color correction is insufficient.

On the other hand, in order to obtain perfect color correction it is possible to adjust the values of Cy, Cm and Cc. That is, all that is necessary in this case is to adjust or control the Cy, Cm and Cc values in equations (2) so that no matter how much the film negative is out of color balance, the prints obtained are gray. It should be noted that the term "gray" here has a wide range, from a light gray to a dark gray. Regardless of the gray density, however, it is possible to control the values of Cy, Cm and Cc so that the resulting prints appear gray no matter how much the film negative is out of color balance. Such prints would appear dark gray with an "over" negative film, however, and light gray with an "under" negative film. This is a condition where the color correction is perfect, but the density correction is excessive.

As is apparent from the above description, the conventional slope circuitry as indicated by equations (1) and (2) is disadvantageous in that the color correction and density correction cannot both be perfect at the same time. This drawback is due to the fact that both color correction and density correction are effected simultaneously rather than independently, and each one may adversely affect the other. To overcome this drawback, a system in which color and density correction can be separately controlled should be employed, by dividing the system into a portion for controlling the extent of correction of the three colors and a portion for controlling the extent of the mean density correction.

In general, however, it is difficult to control the extent of correction of the three colors without affecting the density correction, because if it is intended to make a given color darker, the other colors are inherently made lighter owing to the principle of constant density control.

SUMMARY OF THE INVENTION

An object of this invention is thus to provide a method of exposure quantity control including a slope control system in which the extent of color and density correction can be independently controlled.

The foregoing and other objects of this invention are achieved by providing a slope control system which includes a conventional portion where the extent of color and density correction are both controlled simultaneously, and a portion where only the extent of the density correction is controlled. That is, in this novel slope control system, a portion for controlling just the extent of density correction is added to the conventional slope control system.

DETAILED DESCRIPTION OF THE PREFERRED EMBODIMENT

As briefly described above, in this invention a subsystem for controlling only the extent of the density correction is added to the conventional slope control system, by which addition equations (2) above become modified as follows:

$$Dy' = Cy(Dy - Dn) + Dn + (B - 1) \cdot \left[ \frac{(Dy - Dn) + (Dm - Dn) + (Dc - Dn)}{3} \right]$$

$$Dm' = Cm(Dm - Dn) + Dn + (B - 1) \cdot$$

$$\left[ \frac{(Dy - Dn) + (Dm - Dn) + (Dc - Dn)}{3} \right]$$

$$Dc' = Cc(Dc - Dn) + Dn + (B - 1) \cdot$$

$$\left[ \frac{(Dy - Dn) + (Dm - Dn) + (Dc - Dn)}{3} \right]$$

These equations (3) are obtained by adding the term:

$$(B-1)[(Dy-Dn)+(Dm-Dn)+(Dc-Dn)/3]$$

to each of equations (2), wherein B is a value which determines the extent of the independent density correction. The color correction is not affected by adjusting the value of B. In the slope control technique according to equations (3), if $B=1$ and Cc, Cm and Cy are properly controlled, the density correction is perfect, but the color correction is insufficient, as described above. In order to increase the extent of the color correction the value of B should be less than one. Under these conditions somewhat "under" prints are obtained from an "over" film negative, while somewhat "over" prints are obtained from an "under" film negative. To overcome this difficulty the values of Cy, Cm and Cc are increased in proportion to the decrease in the value of B, and such variation does not affect prints obtained from a standard film negative. That is, variations in the extent of the color correction can be observed only when prints are made from a film negative which is out of color balance.

In contrast to the above case, when the extent of the color correction is to decrease the value of B is made greater than one (1) and the values of Cy, Cm and Cc are correspondingly and compensatingly decreased. Furthermore, if it is unnecessary to change the extent of the color correction but it is desired to change the extent of the density correction, then the values of Cy, Cm and Cc are left as they are and only the value of B is changed.

Figure 1:
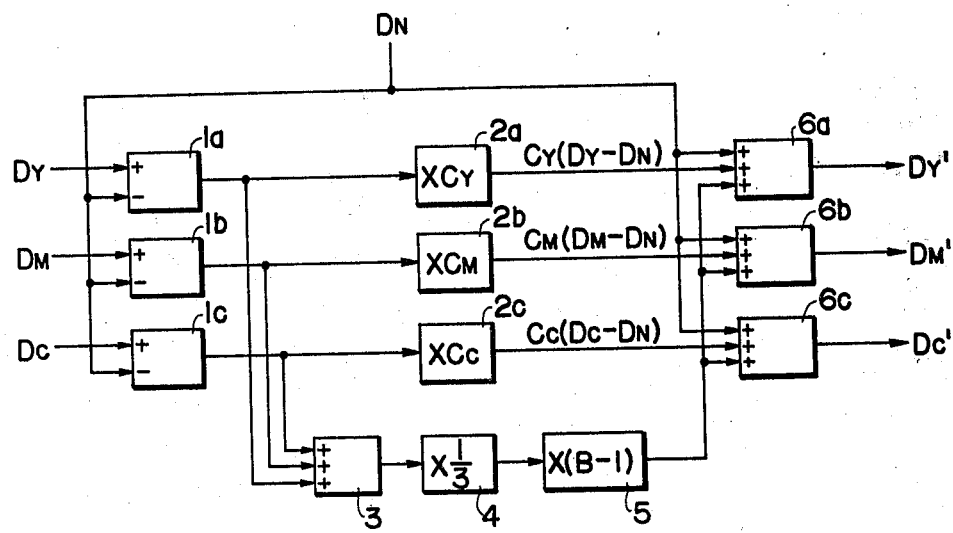
FIGS. 1 and 2 show block diagrams of different circuit embodiments for implementing the exposure control method of the invention.

FIG. 1 shows a block diagram of one embodiment of the invention for implementing slope control in an automatic color printer according to equations (3). In this embodiment, the values $Dy-Dn$, $Dm-Dn$ and $Dc-Dn$ produced by adders 1a, 1b and 1c, respectively, are multiplied by adjustable values of Cy, Cm and Cc in multipliers 2a, 2b and 2c. At the same time, the adder outputs $Dy-Dn$, $Dm-Dn$ and $Dc-Dn$ are additively combined in an adder 3, divided by three in a multiplier 4, and multiplied by $B-1$ in an adjustable multiplier 5. The output of the latter is combined with the output signals of the multipliers 2a, 2b and 2c and with the value of Dn in adders 6a, 6b and 6c, whose outputs thus yield the desired converted density signals Dy', Dm' and Dc' according to equations (3).

Figure 2:
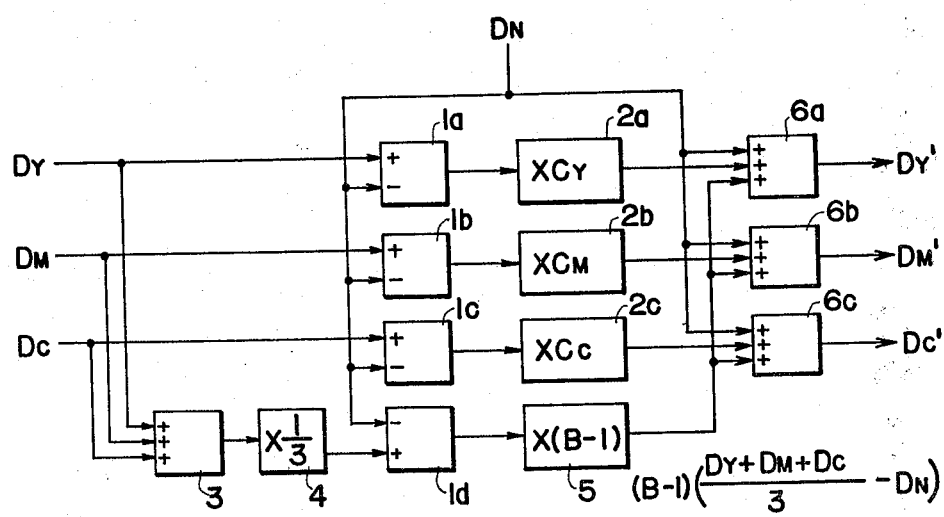

FIG. 2 shows a block diagram of another embodiment of the invention generally similar to that shown in FIG. 1, but wherein Dn is subtracted from the averaged original density values in a separate adder 1d.

As described above, according to this invention the extents of both color and density correction can be independently and widely varied, and can be easily set at desired values in an automatic color printer. The operation of a plurality of automatic color printers can thus be readily and accurately achieved, which contributes to improved print quality stability and to improved color development yields.

What is claimed is:

1. A method of producing a color print from a color film negative, of the type wherein exposure quantity control signals are generated in accordance with the density Dn of a reference negative and the measured color densities of each of the primary colors in light received from said color film negative, and wherein a color print is generated in accordance with said exposure quantity control signals by exposing a photographic paper to predetermined quantities of light of each of said primary colors, said predetermined quantities of light being controlled in accordance with said exposure quantity control signals, said method comprising:

measuring said color densities of said three primary colors of light received from said color film negative;

generating color signals proportional to said measured color densities of each of said primary colors;

logarithmically converting said color signals to obtain color density signals Dy, Dm and Dc;

simultaneously correcting the color densities represented by each of said color density signals and the color balance represented collectively by said color density signals in accordance with the difference between said measured color densities and said reference negative density, and independently correcting the color densities represented by each of said color density signals in accordance with the average difference between said color density signals and said reference negative density, by generating corrected color density signals Dy', Dm' and Dc' defined by:

$Dy' = Cy(Dy-Dn) + Dn + (B-1)$
$[(Dy-Dn)+(Dm-Dn)+(Dc-Dn)/3]$, $Dm' = Cm(Dm-Dn) + Dn + (B-1)[(Dy-Dn) + (Dm-Dn)+(Dc-Dn)/3]$, and, $Dc' = Cc(Dc-Dn) + Dn - (B-1)[(Dy-Dn)+(Dm-Dn)+(Dc-Dn)/3]$, wherein Cy, Cm, Cc and B are constants and $D_n$ is the density of a reference film negative;

exponentially converting said corrected color density signals Dy', Dm' and Dc' of the three primary colors to obtain said exposure quantity control signals; and exposing said photographic paper to predetermined quantities of light of each of said primary colors in accordance with said exposure quantity control signals to thereby obtain said color print.

2. An apparatus for producing a color print from a color film negative, of the type wherein exposure quantity control signals are generated in accordance with the density Dn of a reference negative and the measured color densities Dy, Dm and Dc of the primary colors in light received from said color film negative, and a color print is generated in accordance with said exposure quantity control signals by exposing a photographic paper to predetermined quantities of light of each of said primary colors, said predetermined quantities of light being controlled in accordance with said exposure quantity control signals, said apparatus comprising:

means for measuring said color densities of said three primary colors of light received from said color film negative;

means for generating color signals proportional to said measured color densities of each of said primary colors;

means for logarithmically converting said color signals to obtain said color density signals Dy, Dm, and Dc;

means for simultaneously correcting the color densities represented by each of said color density signals and the color balance represented collectively by said color density signals in accordance with the difference between said measured color densities and said reference negative density, and for independently correcting the color densities represented by each of said color density signals by generating corrected color density signals Dy', Dm' and Dc' defined by:

$Dy' = Cy(Dy-Dn) + Dn + (B-1)$
$[(Dy-Dn)+(Dm-Dn)+(Dc-Dn)/3]$, $Dm' = Cm(Dm-Dn) + Dn + (B-1)[(Dy-Dn) + (Dm-Dn)+(Dc-Dn)/3]$, and, $Dc' = Cc(Dc-Dn) + Dn + (B-1)[(Dy-Dn)+(Dm-Dn)+(Dc-Dn)/3]$, wherein Cy, Cm, Cc and B are constants and $D_n$ is the density of a reference film negative;

means for exponentially converting said corrected color density signals to obtain said exposure quantity control signals; and means for exposing said photographic paper to predetermined quantities of light of each of said primary colors in accordance with said exposure quantity control signals.

* * * * *